United States Patent
Hammes

(10) Patent No.: US 9,864,093 B2
(45) Date of Patent: Jan. 9, 2018

(54) OPTICAL DETECTION APPARATUS

(71) Applicant: SICK AG, Waldkirch/Breisgau (DE)

(72) Inventor: Markus Hammes, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 480 days.

(21) Appl. No.: 14/073,448

(22) Filed: Nov. 6, 2013

(65) Prior Publication Data

US 2014/0138518 A1    May 22, 2014

(30) Foreign Application Priority Data

Nov. 22, 2012  (EP) .................................... 12193838

(51) Int. Cl.
| | | |
|---|---|---|
| *G01V 8/10* | (2006.01) | |
| *G01S 17/42* | (2006.01) | |
| *G01S 17/89* | (2006.01) | |

(52) U.S. Cl.
CPC ............... *G01V 8/10* (2013.01); *G01S 17/42* (2013.01); *G01S 17/89* (2013.01)

(58) Field of Classification Search
CPC ... G01V 8/10; G01V 8/18; G01V 8/26; G01C 3/08; G01S 17/89; G01S 17/42
See application file for complete search history.

(56) References Cited

U.S. PATENT DOCUMENTS

| | | | | |
|---|---|---|---|---|
| 4,196,402 A | * | 4/1980 | Butler | ....................... H01S 5/14 |
| | | | | 372/102 |
| 2005/0219506 A1 | | 10/2005 | Okuda | |
| 2006/0001859 A1 | * | 1/2006 | Lohmann | .............. G01S 7/4812 |
| | | | | 356/5.06 |
| 2012/0182553 A1 | * | 7/2012 | Hulm | ....................... G01S 7/483 |
| | | | | 356/432 |

(Continued)

FOREIGN PATENT DOCUMENTS

| | | |
|---|---|---|
| AT | 510296 A4 | 3/2012 |
| EP | 1992961 A2 | 11/2008 |

(Continued)

OTHER PUBLICATIONS

European Search Report for European Application No. 12 193 838.5 dated Mar. 19, 2013; English Translation Attached.

*Primary Examiner* — Georgia Y Epps
*Assistant Examiner* — Don Williams
(74) *Attorney, Agent, or Firm* — Nath, Goldberg & Meyer; Jerald L. Meyer; Stanley N. Protigal

(57) ABSTRACT

An optical detection apparatus is configured to transmit pulses into a detection zone after one another in different directions which follow one another in a scanning direction over a scanning angle, to receive the radiation of the transmitted pulses returning from the detection zone, to generate a received signal with respect to each transmitted pulse, said received signal depending on the variation with time of the returning radiation of the transmitted pulse, and (Continued)

Figure 1:
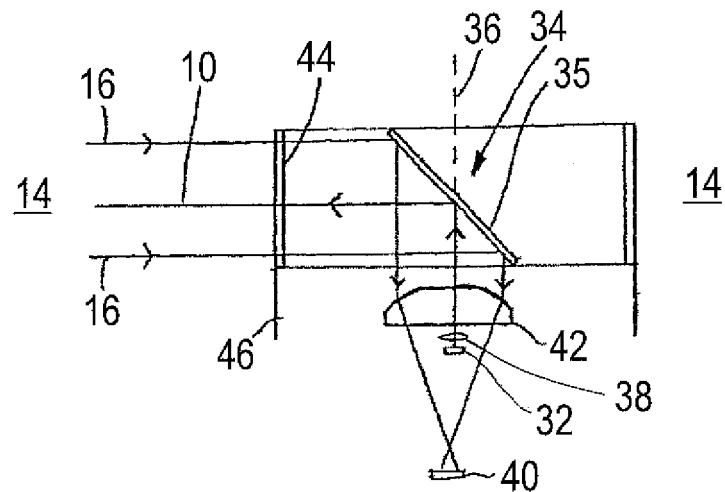

to average the received signals of a group of transmitted pulses to generate an averaged received signal. The angular extent relating to the scanning angle of at least one transmitted pulse of the group at a spacing from the detection apparatus disposed within the detection zone is at most 25 times the size of the angular spacing relating to the scanning angle between two transmitted pulses of the group directly adjacent one another in the scanning direction.

17 Claims, 4 Drawing Sheets

(56) References Cited

U.S. PATENT DOCUMENTS

2013/0003041 A1* 1/2013 Sigmund ................ G01S 7/487
356/5.01

FOREIGN PATENT DOCUMENTS

| EP | 2189814 A1 | 5/2010 |
| EP | 2466328 A1 | 6/2012 |
| EP | 2469296 A1 | 6/2012 |
| EP | 2479586 A1 | 7/2012 |

* cited by examiner a)

b)

a)

b)

a)

b)

a)

b)

OPTICAL DETECTION APPARATUS

The invention relates to an optical detection apparatus, in particular to a laser scanner which receives the radiation of transmitted pulses returning from a detection zone.

Such a detection apparatus is known from EP 2 469 296 A1. The respective apparatus is configured to transmit transmitted pulses in different directions which follow one another in a scanning direction during a scan sweeping over a scanning angle and to average the received signals of a group of transmitted pulses to generate an averaged received signal.

The averaged received signal which is generated by such a multi-pulse evaluation and which is also called a histogram has a much higher quality statistically than the individual received signals so that a more definite statement on the presence of an object in the scanning angle range covered by the group of transmitted pulses can be made in dependence on the depth of averaging even with a small signal-to-noise ratio. It is thereby possible to work with small transmission powers and with simple transmission and reception components, whereby the required construction space and thus the minimally achievable size of the detection apparatus as well as the costs for its manufacture can be reduced.

Even if the presence of an object in the scanning angle range covered by the group of transmitted pulses can be reliably recognized with reference to the averaged received signal, no reliable statement on the spatial extent of such an object within the respective scanning angle range can be made. Such a classification or distinction of recognized objects by object size is, however, advantageous for specific applications. For example, there is thus an interest in safety applications to distinguish an object present in the detection zone and having an extent whose size corresponds to the order of magnitude of the scanning angle range covered by the group of transmitted pulses from a much smaller object, such as a speck of dust, which may be irrelevant for the safety application. An identification of narrow object edges may equally be desirable.

In known apparatus, the resolution with respect to the object size is limited by the size of the scanning angle range respectively covered by a group of transmitted pulses. The large overlap between the transmitted pulses of a group in this respect has the result that a similar number of transmitted pulses of the group comes to lie at least regionally on the respective object independently of the size of an object present in the covered scanning angle range. The transmitted pulses in this respect generate approximately identical received pulses for large and small objects in their respective received signals so that large and small objects can also not be reliably distinguished using the averaged received signals generated from them.

It is the object of the invention to provide an optical detection apparatus and a method of detecting objects using an optical detection apparatus with which a reliable detection of objects is possible and simultaneously a reliable and exact statement with respect to the extent of the objects is possible. It should in particular be made possible to distinguish between objects which have a specific minimum size and much smaller objects such as specks of dust or narrow edges of articles. The apparatus should moreover be able to be realized in a small construction space and be inexpensive to manufacture.

The object is satisfied by an optical detection apparatus in which an angular extent related to a scanning angle of at least one transmitted pulse from a detection apparatus disposed within the detection zone is able to determine the size of an object in the detection zone.

The optical detection apparatus in accordance with the invention, which can in particular be configured as a laser scanner is adapted
- to transmit a plurality of transmitted pulses into a detection zone after one another in directions following one another in a scanning direction during a scan sweeping over a scanning angle;
- to receive the radiation of the transmitted pulses respectively returning from the detection zone;
- to generate a received signal with respect to each transmitted pulse, said received signal depending on the variation with time of the returning radiation of the transmitted pulse; and
- to average the received signals of a group of transmitted pulses to generate an averaged received signal.

The angular extent relating to the scanning angle of at least one transmitted pulse of the group at a spacing from the detection apparatus disposed within the detection zone is at most twenty times the size of the angular spacing relating to the scanning angle between two transmitted pulses of the group directly adjacent one another in the scanning direction.

It was recognized that, when transmitted pulses having a large angular extent or spot size and a correspondingly large overlap of adjacent transmitted pulses in the detection zone are used, an unchangingly high number of transmitted pulses is also reflected at objects when the objects have a small extent so that no distinction between larger and smaller objects is possible with reference to the averaged received signal. In contrast to this, the apparatus in accordance with the invention produces averaged received signals which differ significantly in dependence on the extent of a detected object so that a distinction between more extended and smaller objects is reliably possible despite the noise influences present.

An overlap which is considerably reduced in comparison with the prior art is effected between the transmitted pulses of a group in the detection zone by the small extent or spot size of the transmitted pulses in comparison with the angular spacing of two transmitted pulses following one another. If, for example, the transmitted pulses are transmitted at unchanging angular spacings from one another, it can be achieved by the size relationship in accordance with the claim that a transmitted pulse of the group overlaps with at most 20 further transmitted pulses of the group. On the presence of a small object whose extent lies e.g. in the order of magnitude of the angular spacing of two transmitted pulses, only a small number of, for example, at most 20 transmitted pulses are incident on the object and are reflected back, whereas a portion of the transmitted pulses of the group shoot completely past the object. The smaller number of reflections in comparison with a larger object can be reliably detected in the averaged received signal, e.g. with reference to a reduced amplitude of a signal oscillation produced from the reflections in the manner explained in more detail below in the course of the signal evaluation so that a reliable distinction between small and large objects is possible.

Advantageous embodiments of the invention are set forth in the dependent claims, in the description and in the Figures.

In accordance with further embodiments, the angular extent related to the scanning angle of at least one transmitted pulse of the group at a spacing from the detection apparatus disposed within the detection zone is at most fifteen times the size, preferably at most ten times the size, further preferably at most five times the size, further preferably at most three times the size, or further preferably at most two times the size of the angular spacing relative to the scanning angle between two transmitted pulses of the group directly adjacent in the scanning direction. The number of the transmitted pulses impacting on a small object can thereby be reduced even further so that an even more reliable distinction or classification by large and small objects is possible with reference to the detected received signal.

In accordance with a further embodiment, the cross-section of at least one transmitted pulse of the group overlaps with at most a quarter of the other transmitted pulses of the group at a spacing from the detection apparatus disposed within the detection zone. It is thereby ensured that the number of the transmitted pulses of a group incident on a small object in particular differs significantly from the number of transmitted pulses which are incident on an object whose size lies in or above the order of magnitude of the scanning angle range covered by the group of transmitted pulses. To allow an even more reliable or even more sensitive distinction between large and small objects, the cross-section of the transmitted pulse in the considered spacing from the detection apparatus can have an overlap with the other transmitted pulses of at most 20%, preferably at most 15%, further preferably at most 10%, further preferably at most 5% or further preferably at most 3%. The absolute number of the transmitted pulses which has an overlap with the at least one transmitted pulse of the group at a spacing disposed within the detection zone can, for example, amount to at most 20, preferably at most 15, further preferably at most 10, further preferably at most 5, further preferably at most 3 or further preferably at most 2.

In accordance with a further development, the detection apparatus in accordance with the invention is adapted to determine and evaluate a peak value of the averaged received signal in order preferably to determine from this the size of a detected object within a scanning angle range covered by the group. The peak value of the averaged received signal can be a maximum or a minimum of the averaged received signal. The peak value can in particular be a maximum or a minimum of an oscillation which is generated in the averaged received signal by a recognized object as a consequence of the signal evaluation explained in more detail in the following, comprising an oscillation excitation and comprising one or more vibration periods. The peak value can also be formed by an amplitude of the oscillation related to an average value of the oscillation.

The peak value of the averaged received signal can be compared with at least one predefined value to determine the size of the object and to classify the recognized object, in particular with reference to the exceeding or falling below of the predefined value, into one of at least two predefined classes. For example, the spacing of the peak value from a predetermined upper or lower limit value can be determined, with the reaching or approximate reaching of the upper and/or lower limit value indicating the presence of an object extending over the total scanning angle range covered by the transmitted pulse group. The peak value of the received signal can also be compared with a plurality of different predefined value to classify the recognized objects into more than two size classes.

In accordance with an embodiment, object recognitions indicating an object having a size below a specific minimum size are discarded. For example, the optical detection apparatus can be configured as a safety-directed apparatus which examines the detection zone within the framework of a safety function for the entry of objects and, for example, outputs a safety signal on the entry of an object of a specific minimum size, whereas smaller objects can be considered as not safety-critical and can be ignored within the framework of the safety function to avoid unnecessary safety measures.

The optical detection apparatus is preferably adapted to generate the averaged received signal as a time-resolved signal and in particular to determine the spacing of a detected object from the detection apparatus in accordance with the time of flight principle using the averaged received signal. For this purpose, on the evaluation of the averaged received signal, a determination is preferably made of the point in time at which or in which time interval from the transmission of a transmitted pulse radiation of the transmitted pulse reflected back from an object is received, i.e. an object appears in the averaged received signal. A conclusion on the spatial distance of the object can then be determined from the time spacing with the aid of the speed of light.

To determine an object or its size or spacing from the detection apparatus, the detection apparatus can identity one or more time sections of the averaged received signal which have a characteristic signal form for a detected object. Depending on the signal processing carried out within the framework of the generation of the averaged received signal, an object in the averaged received signal can, for example, appear as an oscillation of the averaged received signal having one or in particular a plurality of oscillation periods, wherein an average value of the oscillation preferably corresponds to an expected value of the averaged received signal in the absence of an object. A time in the averaged received signal decisive for the determination of the spacing of the object from the detection apparatus can, for example, be determined with reference to the staring oscillation time of the oscillation representing the object or to the first peak value or to a further peak value or averaged value pass of the oscillation or to a combination thereof.

The above-described differentiability of objects of different sizes also allows the recognition of a plurality of objects arranged behind one another in the transmission direction and the distinction of such objects from a single object. If two objects are arranged behind one another in the transmission direction and have a small difference from one another in the transmission direction, the case can occur that the time periods of the averaged received signal which indicate the two objects arranged behind one another or are influenced by them overlap one another in time or merge directly into one another. If the objects in the scanning angle range have different extents, this results in different peak values of the signal sections associated with the respective objects so that the two signal sections can be distinguished with reference to the different peak values and the presence of two or more objects instead of a single object can be recognized. Contours of articles such as edges which bound a region of an article set back in the transmission direction can thus also be recognized. The detection apparatus is preferably adapted for this purpose to recognize when a plurality of signal sections are present in the averaged received signal which each indicate the presence of an object and which in particular have different peak values.

To receive the returning radiation of the transmitted pulses and to generate the received signals, the optical detection apparatus preferably has a reception unit which can comprise a reception optics such as a reception lens. The reception optics focuses the received radiation e.g. onto a reception element which is sensitive to the radiation and which converts the radiation into an electrical signal and comprises a photodiode such as an avalanche photodiode (APD), for example. The received element can be configured to generate an electrical signal which is essentially proportional to the curve of the intensity or power of the incident radiation to which the reception element is sensitive. The originally generated received signal is preferably a unipolar signal corresponding to the always positive radiation intensity.

In accordance with an advantageous embodiment, the detection apparatus is adapted, for the generation of the received signal of a transmitted pulse, to convert a unipolar signal generated from the returning radiation of the transmitted pulse, in particular an original received signal as described above, into a bipolar signal. For this purpose, a filter is for example used which is excited to an oscillation by the original received signal. The filter can contain a resonant circuit, a band pass filter or a differentiating member and can in particular be configured for generating an analog bipolar signal. The robustness of the following signal evaluation is increased by the generation of the bipolar signal. The averaged received signals generated from these signals can be evaluated particularly easily, reliably and robustly with respect to their peak values.

In accordance with a further embodiment, the detection apparatus is adapted, for the generation of the received signal of a transmitted pulse, to quantize a signal generated from the returning radiation of the transmitted pulse, in particular for generating a binary signal. The signal to be quantized is preferably formed by a bipolar received signal generated in accordance with the above description. The signal amplitudes of the individual received signals are brought to equal, normed values and thus standardized by the quantization so that the appearance of an object in a received signal is always reflected by a uniform weighting in the averaged received signal. As a consequence of the quantization, the averaged received signal can be generated such that the value of the averaged received signal corresponds to the sum of the individual received signals or transmitted pulses at least at specific points in time, said received signals or transmitted pulses having a signal shape indicating an object detection or the presence of an object.

For the quantization, the detection apparatus can have a limiting amplifier which selectively amplifies all signal values above or below a threshold, for example all positive or negative signal portions, to a saturation value of the amplifier. The above-described steps of the signal generation, of the bipolarization and of the quantization preferably each take place, where provided, in the time-continuous analog range.

The detection apparatus is preferably adapted, for the generation of the received signal of a transmitted pulse, to sample in time a signal generated from the returning radiation of the transmitted pulse. The signal to be sampled is in this respect preferably formed by a quantized signal generated in accordance with the above description. A time-resolved recording of the variation with time of the signal is generated by the sampling, with each sampled value indicating the value of the sampled signal at the respective sampling time. As part of the sampling, an analog/digital conversion of the signal can take place, wherein e.g. an A/D converter is used which is in particular configured as a binarizer and generates a binary digital received signal. In view of the binarization, which preferably already took place in the analog range, the A/D converter can be adjusted so that the two analog binary values of the analog signal are each mapped to one of the digital values "0" and "1" of the digital received signal.

In accordance with an advantageous embodiment, the averaged received signal comprises a plurality of averaged sampled values which each represent an averaged value of the sampling values corresponding to one another in time of the received signals of the transmitted pulses of the group of transmitted pulses. On the averaging, those sampled values are combined which represent the same spacing from the detection apparatus, that is which were determined at the same time interval from the transmission of the transmitted pulse belonging to the respective received signal or which were generated from the radiation of the transmitted pulse received up to this point in time. An averaging is here in principle not only to be understood as a forming of an average in the strictly mathematical sense, but rather as a combination of a plurality of sampled values or received signals which, in statistical terms, amplifies the useful signal portions contained in the received signals and generated by the returning radiation of the transmitted pulses with respect to the contained noise signal portions. For example, the respective corresponding sampled values of the individual received signals can be added to generate the sampled values of the averaged received signal.

To transmit the transmitted pulses, a transmission emitter can be provided which has an active emission surface having a maximum extent between 1 and 10 μm and preferably between 1.5 and 6 μm. Such an emission surface is particularly well-suited for generating transmitted pulses having a small spot size. The transmission emitter can be configured for transmitting laser radiation, in particular in the form of Gaussian rays. In principle, however, a different electromagnetic radiation can also be used. The extent of a transmitted pulse is limited by the $1/e^2$ extent of the ray and is consequently restricted by the outer contour of the cross-section observed perpendicular to the main ray axis at which the intensity of the radiation has fallen with respect to its maximum value relative to the cross-section to a value of $1/e^2$ (13.5%). The detection apparatus can furthermore have a transmission optics which bundles the light generated by the transmission emitter and comprises, for example, a collimation lens for this purpose.

The transmission emitter can also work with a smaller power and a relatively small pulse duration due to the higher reliability achieved by the multi-pulse evaluation, but in exchange optionally with a high pulse repetition rate. For example, the peak optical performance of a transmitted pulse can lie between 0.4 W and some 10 W, for example up to 20, 40 or 80 W. The pulse duration of an individual pulse can lie in the range of 4 ns. The pulse repetition rate can lie between 0.5 and 10 MHz. Due to this high repetition frequency, a high angular resolution of the optical detection apparatus can be achieved with a simultaneously high averaging depth of the averaged received signals and a correspondingly higher reliability of the object detection.

To achieve an averaging depth sufficient for the reliable object detection, a group of transmitted pulses can comprise at least 40 transmitted pulses and preferably at least 50 transmitted pulses. The group can, for example, have at least 60, 70, 80 or 90 transmitted pulses. To achieve a sufficient angular resolution on a sampling of the scanning angle with a plurality of groups of transmitted pulses following one another, the number of transmitted pulses of the group can be limited e.g. to up to 200, up to 150, up to 120 or up to 100 pulses.

In accordance with an advantageous embodiment, the detection apparatus is adapted to transmit a plurality of groups of transmitted pulses and to generate a respective averaged received signal from the received signals of the transmitted pulses of a group. The received signal of the transmitted pulses and the averaged received signal of each group can in this respect be generated in the above-described manner.

The transmitted pulses of different groups are preferably transmitted into the detection zone in different directions. Each group preferably covers a scanning angle range defined by the transmission directions of its transmitted pulses, with the scanning angle ranges of a plurality of groups together covering the total scanning angle range and overlapping one another in full or in part or adjoining one another without overlap. A group preferably comprises pulses transmitted directly following one another in time without non-group pulses transmitted between them. In principle, however, a transmitted pulse of another group can also be transmitted between two transmitted pulses of a group. It is, for example, possible that every nth transmitted pulse is associated with one group during a time period and the n−1 pulses transmitted therebetween in time are associated with further groups.

The total scanning angle is thus sampled by groups of transmitted pules which each cover a part of the scanning angle. In this respect, when an object is recognized in the above-described manner, a measured distance value for the object can be generated from the averaged received signal of a group. A two-dimensional spatially resolved image of the detection zone can be generated from the measured distance values of the different groups and contains the objects located in the detection zone and in particular their position with respect to the scanning angle and their spacing from the detection apparatus. The position precision with respect to the scanning angle is in this respect predefined by the number and arrangement of the groups of transmitted pulses. In addition, the optical detection apparatus is able to distinguish, in the manner described above, objects whose angular extent is in the order of magnitude of the scanning angle range covered by a group of transmitted pules from much smaller objects such as individual dust specks.

In accordance with an advantageous embodiment, the detection apparatus is adapted to recognize when the averaged received signals of adjacent groups of transmitted pulses each indicate the presence of an object. In this case, it can be assumed with a high probability that the detections originate from a coherent object which is impacted by transmitted pulses of different groups. The total extent of the object is then determined by how many adjacent groups of transmitted pulses are spanned by the object. The margin of the object will typically be located in the interior of a scanning angle zone covered by a group of transmitted pulses so that the received signal of this transmitted signal group indicates an extent of the object only over a part of the scanning angle region covered by the transmitted pulse group. A particularly exact localization of object edges is made possible by the determination of the exact angular extent of the extended object within the scanning angle region of the respective transmitted pulse group using the respective averaged received signal.

In accordance with an advantageous embodiment, the apparatus has a deflection unit which is rotatingly movable about an axis of rotation and with which the transmitted pulses can be directed into the detection zone. The direction of a transmitted pulse is in this respect predefined by the angular position of the deflection unit during the transmission of the transmitted pulse so that the transmitted pulses transmitted following one another in time are transmitted in different directions, which follow one another in the scanning direction, due to the rotating movement of the deflection unit. In this respect, a substantially constant angular offset between the directions of two transmitted pulses transmitted following one another can be realized, which results in a uniform sampling of the detection zone.

The optical detection apparatus can have one or more scan planes into which the transmitted pulses are transmitted to enable a quasi-three-dimensional detection. If the optical detection apparatus comprises a plurality of scan planes, the transmitted pulses of a group of transmitted pulses preferably each belong to the same scan plane, with in principle, however, a combination of transmitted pulses from a plurality of scan planes in one group being possible. A scan of the detection apparatus can cover the largest possible scan angle of 360°, but it can in principle also be an optical detection apparatus having a scan angle of a total of less than 360°, for example 180°. The scan angle range covered by a group of transmitted pulses can amount to approximately 0.1°, for example.

The above-described specification of the relationship of the angular extent of a transmitted pulse of a group with the angular spacing of two adjacent transmitted pulses of the group and/or the specification of the number of the transmitted pulses of the group which overlap with the cross-section of the transmitted pulse is preferably satisfied by the respective transmitted pulse at each spacing from the detection apparatus disposed within the detection zone. The detection zone is in this respect the zone in which an object detection using the optical detection apparatus is possible and extends, for example, from an outer front screen of the apparatus arranged in the beam path up to the maximum spacing from the optical detection apparatus measured from the front screen, at which spacing an object detection is still just possible using the apparatus under normal conditions. The transmitted pulse can, for example, satisfy the respective specification or specifications at least over a spacing region of 0 m to approximately 5.5 m, for example.

It is furthermore preferred if the specification described in the above of the relationship of the angular extent of a transmitted pulse relative to the angular spacing of two transmitted pulses and/or the specification of the number of the transmitted pulses overlapping with the cross-section of a transmitted pulse of a group is not only satisfied by one transmitted pulse, but by a plurality, and preferably by all of the transmitted pulses of a group and/or by the transmitted pules of a plurality of, and preferably all transmitted pulse groups. The angular spacing between two transmitted pulses of a group which are directly adjacent in the scanning direction, which is decisive within the framework of the above specification, is in this respect preferably given by the smallest angular spacing of two transmitted pulses of the respective group which are directly adjacent in the scanning direction, that is the angular extent of the transmitted pulse is e.g. at most twenty times the size of the smallest angular spacing of two transmitted pulses of this group.

The invention moreover relates to a method of detecting objects arranged in a detection zone using an optical detection apparatus, wherein a plurality of transmitted pulses are transmitted into a detection zone after one another in different directions following one another in a scanning direction during a scan sweeping over a scanning angle;

the respective radiation of the transmission pulses returning from the detection zone is received;

a received signal with respect to each transmitted pulse, is generated, said received signal depending on the variation with time of the returning radiation of the transmitted pulse; and the received signals of a group of transmitted pulses are averaged to generate an averaged received signal.

The angular extent relating to the scanning angle of at least one transmitted pulse of the group at a spacing from the detection apparatus disposed within the detection zone is at most twenty times the size of the angular spacing relating to the scanning angle between two transmitted pulses of the group directly adjacent one another in the scanning direction.

The method in accordance with the invention can be carried out using an optical detection apparatus in accordance with the invention as described herein. The advantageous embodiments and advantages described above with respect to the optical detection apparatus in accordance with the invention represent advantageous embodiments and advantages of the method in accordance with the invention on a corresponding use.

Figure 2:
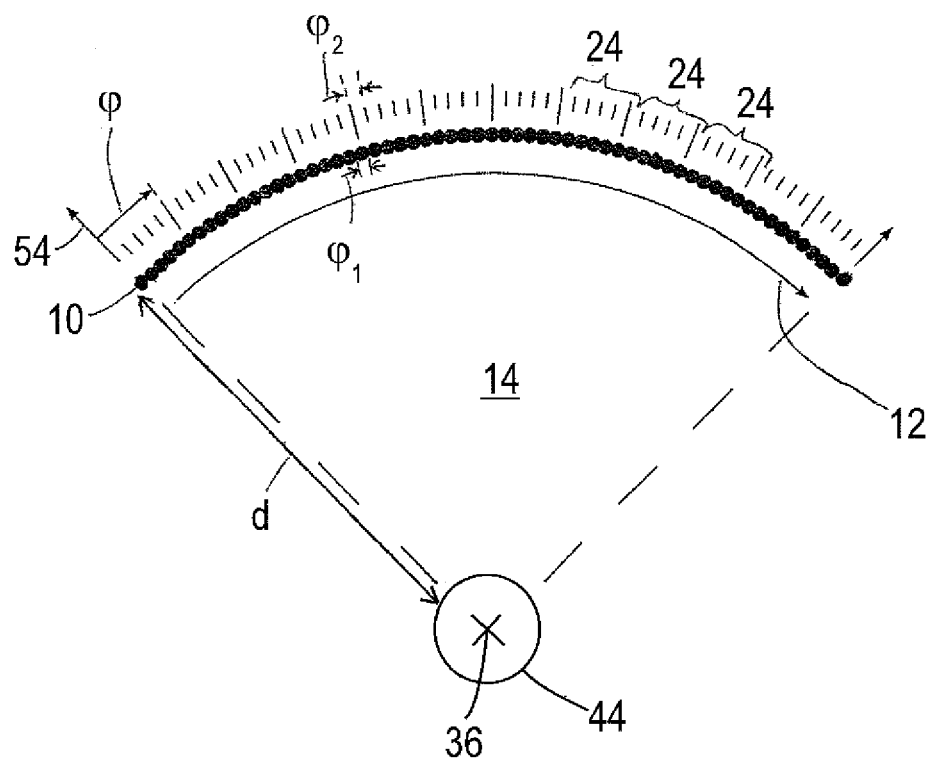
Figure 3:
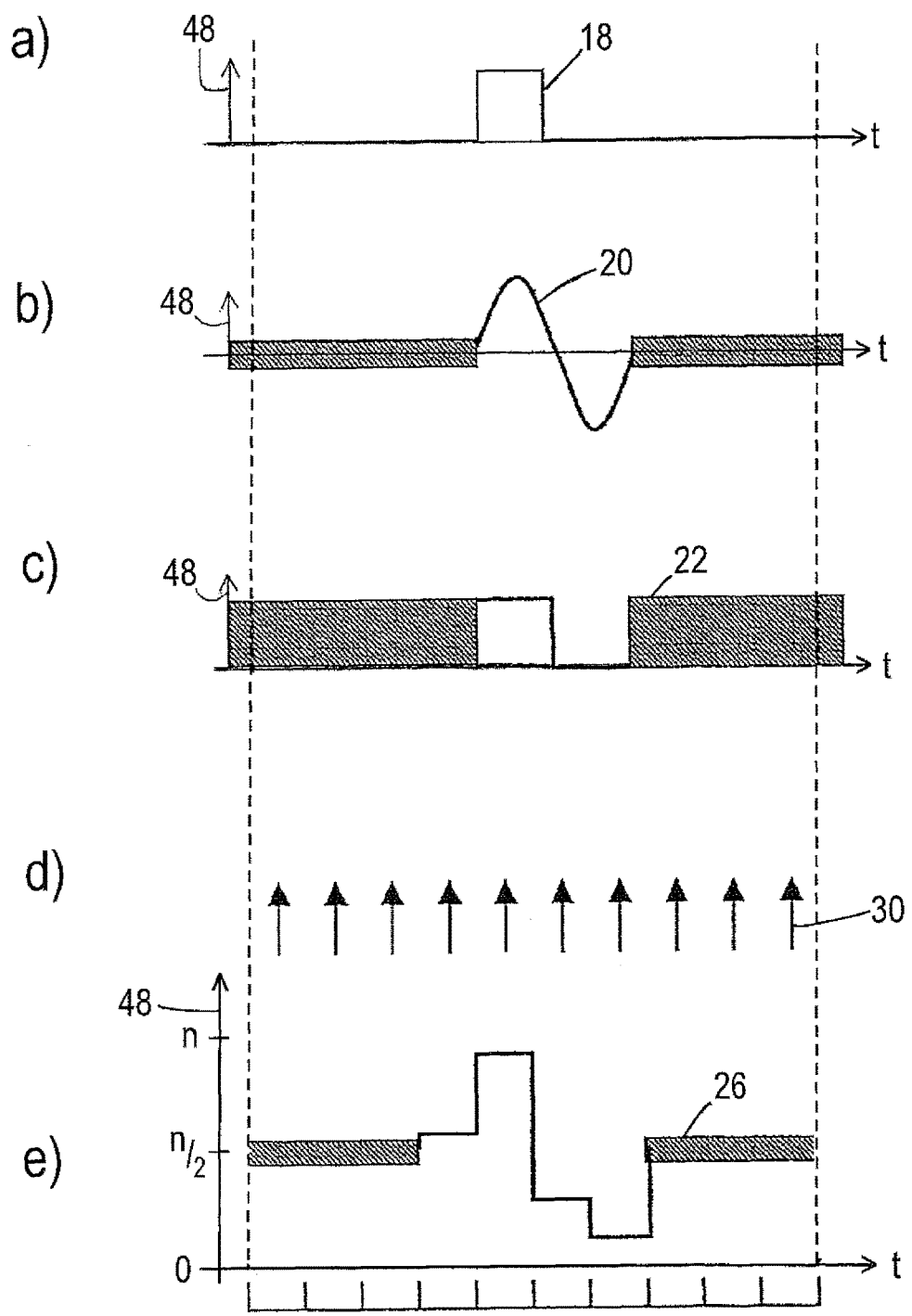
Figure 4:
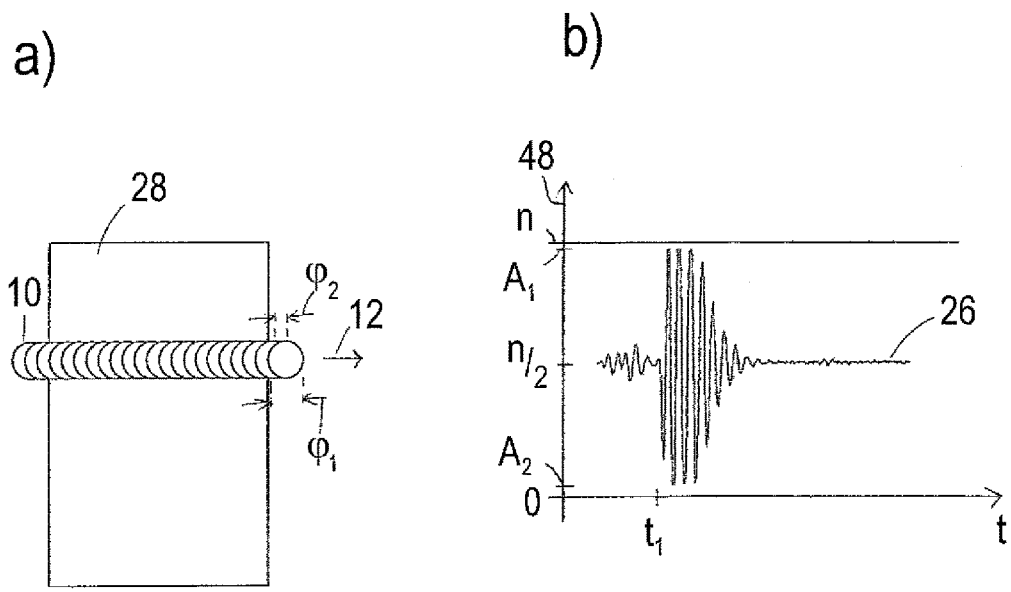
Figure 5:
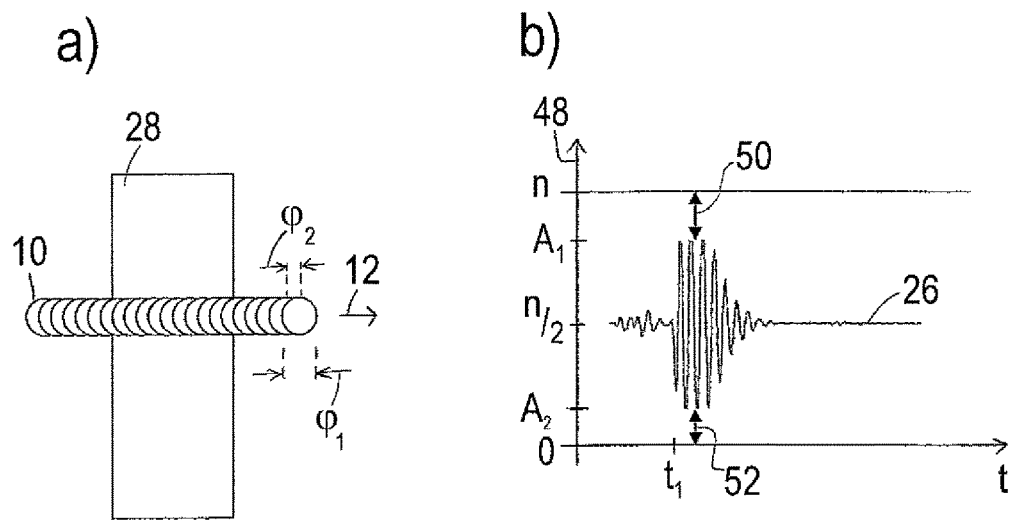

The present invention will be described in the following by way of example with reference to advantageous embodiments and to the enclosed Figures. There are shown:

FIG. 1 an optical detection apparatus in accordance with an embodiment of the invention in an axial section;

FIG. 2 the optical detection apparatus of FIG. 1 with transmitted transmitted pulses viewed from above;

FIG. 3 signal curves generated by the optical detection apparatus of FIGS. 1 and 2; and FIGS. 4-7 a respective object (FIGS. 4a, 5a, 6a, 7a) to be detected by a group of transmitted pulses and a corresponding averaged received signal (FIGS. 4b, 5b, 6b, 7b).

FIG. 1 shows a schematic representation of an optical detection apparatus configured as a laser scanner in accordance with an embodiment of the invention in an axial section.

A transmission emitter 32 arranged in the housing 46 of the apparatus transmits laser radiation through a transmission lens 38, and indeed in the form of short transmitted pulses 10 following one another at regular time intervals. The transmitted pulses 10 are directed by a deflection unit 34 having a mirror 35 which rotates about an axis of rotation 36 and is slanted with respect to the axis 36 into a detection zone 14 which is demarcated from the laser scanner by a front screen 44 configured in the form of a cylinder jacket and arranged concentrically to the axis of rotation 36 in the present embodiment. The transmitted pulses 10 transmitted following one another are deflected by the rotating mirror 35 in a scanning direction 12 (FIG. 2) predefined by the direction of rotation about the axis of rotation 36 and thus sweep over the total 360° scanning angle in the course of one orbit of the mirror 35. The radiation 16 of a transmitted pulse 10 returning from the detection zone 14 is deflected via the mirror 35 onto a reception lens 42 and is bundled by the reception lens 42 onto a reception element 40 which generates an electrical signal dependent on the incident radiation 16. An evaluation unit, not shown, which carries out the signal processing and signal evaluation described in the following, is connected to the reception element 40.

FIG. 2 shows the laser scanner of FIG. 1 viewed in the direction of the axis of rotation 36 with a plurality of transmitted pulses 10 transmitted into the detection zone 14. The transmitted pulses 10 are transmitted into the detection zone 14 in different directions 54 following one another in the scanning direction 12 and each corresponding to a scanning angle φ defined relative to the axis of rotation 36. The transmitted pulses 10 are in this respect shown in FIG. 2 only for a 90° segment of the scanning angle φ comprising a complete 360° orbit in the present embodiment. As is shown in FIG. 2, the detection zone 14 or the scanning angle φ is completely sampled by the discrete transmitted pulses 10 having a substantially constant step width.

The transmitted pulses 10 are in this respect divided into groups 24 which each comprise a plurality of transmitted pulses 10 transmitted directly after one another and covering a closed scanning angle range. The scan angle φ is thus discretely sampled or scanned by the groups 24 of transmitted pulses 10, with the step width of this sampling corresponding to the sum of the step widths of the transmitted pulses 10 of the group 24. In reality, a group 24 can have considerably more transmitted pulses 10 and can cover a smaller scanning angle range than shown in FIG. 2.

In FIG. 2, the transmitted pulses 10 are each shown by their radiation cross-section viewed perpendicular to the respective transmission direction 54 and substantially of circular shape at a spacing d from the detection apparatus. As can be seen from FIG. 2, the angular extent $\varphi_1$ of a transmitted pulse 10 relative to the scanning angle φ is, in the embodiment shown, approximately just as large as the angular spacing $\varphi_2$ relative to the scanning angle φ of two transmitted pulses 10 directly adjacent in the scanning direction 12, i.e. transmitted directly after one another.

FIG. 3 shows by way of example signal curves generated by the optical detection apparatus shown in FIGS. 1 and 2, with the value of the signal being entered on the vertical axis 48 and the time t being entered on the horizontal axis.

FIG. 3a shows the signal 18 directly generated by the reception element 40 (FIG. 1) from the returning radiation of a transmitted pulse. The signal 18 contains a received pulse at a point in time, with the time interval of the occurrence of the received pulse from the transmission of the transmitted pulse corresponding to the time of flight of the transmitted pulse from the laser scanner to a detected object and back. The received pulse is shown in idealized form as a rectangular pulse without noise portions or shape distortions which can, however, be substantial in reality. In principle, the laser scanner can even be configured within the framework of the invention such that the signal 18 is so noisy that the received pulse originating from an object is substantially lost in the signal 18 and no reliable object detection is possible with respect solely to the signal 18 since it is not possible to reliably distinguish between an object and the noise.

The signal 18 is a unipolar signal. It is converted by a filter connected to the reception element 40 into a bipolar signal 20 (FIG. 3b), with only one oscillation period of the oscillation excited by the rectangular pulse of the signal 18 being shown in FIG. 3b for reasons of simplicity. The hatched regions of the signal 20 shown next to the oscillation period represent the noise present in the signal 20.

The signal 20 is supplied to a limiting amplifier which generates the signal 22 from it (FIG. 3c) and in this respect selectively amplifies the positive portions of the bipolar signal 20 up to and into the saturation of the limiting amplifier such that the sinusoidal oscillation of the bipolar signal 20 is converted into a rectangular wave and the noise shown as hatched is stretched over the total value range of the signal 22. The positive values of the bipolar signal 20 are consequently mapped to a saturation value of the limiting amplifier in the signal 22 and the negative values are mapped to the value zero. The above signal evaluation takes place in an analog and time-continuous manner, that is the time t entered on the horizontal axis corresponds to the actual time.

The variation with time of the signal 22 is recorded. For this purpose, the signal 22 is sampled in time and is thereby made discrete in time and is simultaneously binarily digitized. FIG. 3d shows a sequence of equidistant sampling times 30 which are shown by arrows and at which a respective sampled value of the signal 22 is determined and recorded. The time density of the taken sampled values related to the period duration of the oscillation of the signal 22 can be selected considerably higher than shown in FIG. 3d in practice.

The received signals generated by the sampling and digitizing, which are present as bit sequences, are used to generate an averaged received signal 26 (FIG. 3e) which can also be called a histogram. The histogram 26 in this respect comprises a plurality of sampled values or "bins" which each represent an averaged value of the sampled values corresponding to one another in time, that is determined at the same time interval from the transmission of the respective transmitted pulse. An accumulator is provided for each bin for this purpose and is only counted up with an associated bit value "1". With ideal signals without noise, only that bin or those bins are filled in this histogram 20 over which the position portion of the rectangular wave of the signal 22 lies. The noise level raised by the limiting amplifier, however, also fills the remaining bins, with e.g. approximately every second signal 22 having a positive value in such a bin due to the randomness of the noise.

The value of the averaged received signal 26 thus corresponds at each time t to the sum of the sampled values of the individual signals 22 combined in the averaged received signal 26 or to their sampled records at the respective point in time. The value of the averaged signal 26 thus varies between the value zero, when no received signal has a value "1" at the respective point in time, and the value n, when all n received signal have a value "1" at the respective point in time. A rectangular wave respectively present in the signals 22 is reproduced in the averaged received signal 26, with the positive half-wave of the rectangular wave reproduced from the signals 22 adopting a peak value of approximately n in the signal 26 and the negative half-wave of the rectangular wave adopting a peak value of approximately zero in the signal 26. The deviation of the actual signal shape from a perfect rectangular wave which would extend from zero to n can be explained by the noise and a slight temporal deviation of the occurrence of the rectangular wave in the individual signals 22 which results in a temporal moving apart of the rectangular wave. Outside the rectangular wave, the value of the signal 26 is determined by the noise in the signals 22, with the expected value of the signal 26 amounting, for example, to n/2 and the actual signal 26 differing from the value n/2 within the framework of a noise level as is illustrated by hatched signal regions in FIG. 3e.

FIGS. 4 to 7 show exemplary object detections with reference to an averaged received signal 26 which is generated by a laser scanner in accordance with an embodiment of the invention in the manner described above with respect to FIG. 3.

FIG. 4a shows an object 28 arranged in the detection zone from the perspective of the laser scanner and additionally a group of transmitted pulses 10 which are incident onto the object 26 and are shown figuratively by their cross-section present at the spacing of the object 28 from the laser scanner. As is shown in FIG. 4a, the angular extent $\varphi_1$ of the transmitted pulses 10 is in each case only approximately 2.5 times as large as the angular spacing $\varphi_2$ between two transmitted pulses 10 with respect to the scanning angle $\varphi$.

FIG. 4b shows the averaged received signal 26 generated from the received signals of the transmitted pulses 10 of FIG. 4a. The signal 26 shown in FIG. 4b in this respect, in comparison with the signal 26 shown in FIG. 3e, has a larger number of sampled values per oscillation period, whereby the approximately continuous curve of the signal 26 shown in FIG. 4b results. The object 28 is visible in the signal 26 in the form of pronounced oscillations, with the post-oscillations decaying with the time also being shown in contrast to the representation in FIG. 3e. A plurality of oscillation periods having a maximum value $A_1$ and a minimal value $A_2$ are present in the signal 26 and approximately correspond to the respective limit value n and zero, with the slight difference from these limit values being due to the fact that the transmitted pulses 10 disposed furthest to the left and furthest to the right each completely miss the object 28 and thus do not result in a reflected pulse in the corresponding received signal. It can thus be recognized with reference to the peak values $A_1$ and $A_2$ and their difference from the limit values n and zero that the object 28 has an angular extent slightly reduced with respect to the scanning angle range covered by the group. The size of the object 28 can thus be reliably estimated within the framework of a precision predefined by the noise present.

In addition, the spacing of the object 28 from the detection apparatus can be determined with reference to the starting oscillation time $t_1$ at which the object becomes visible in the received signal 26. Instead, the point in time of the first pass or of a later pass of the oscillation through the average value n/2 could also e.g. be selected to estimate the object spacing.

FIGS. 5a and b show the situation shown in FIGS. 4a and b on the presence of a smaller object 28 in the detection zone. In FIG. 4b, the spacings 50, 52 of the peak values $A_1$, $A_2$ from the limit values n and zero are made visible. Since a large number of transmitted pulses 10 miss the object 28 due to the smaller object 28, as shown in FIG. 5a, the amplitude of the oscillations in FIG. 5b is smaller and the spacings 50, 52 are correspondingly larger than in the received signal 26 shown in FIG. 4b. It can be reliably recognized by an evaluation of these spacings 50, 52 that it is a question of a smaller object 28.

FIGS. 6a and b show the detection situation shown in FIGS. 4a and b using a laser scanner having a larger spot size of the transmitted pulses 10. As shown in FIG. 6a, the transmitted pulses 10 have an angular extent $\varphi_1$ which is approximately ten times as large as the angular spacing $\varphi_2$ of two adjacent transmitted pulses 10 so that in FIG. 6a all the transmitted pulses 10 are incident onto the object 28 and the peak values $A_1$, $A_2$ of the oscillations representing the object 28 in the averaged received signal 26 (FIG. 6b) coincide with the limit values n or zero, where applicable up to a slight difference caused by noise.

Figure 6:
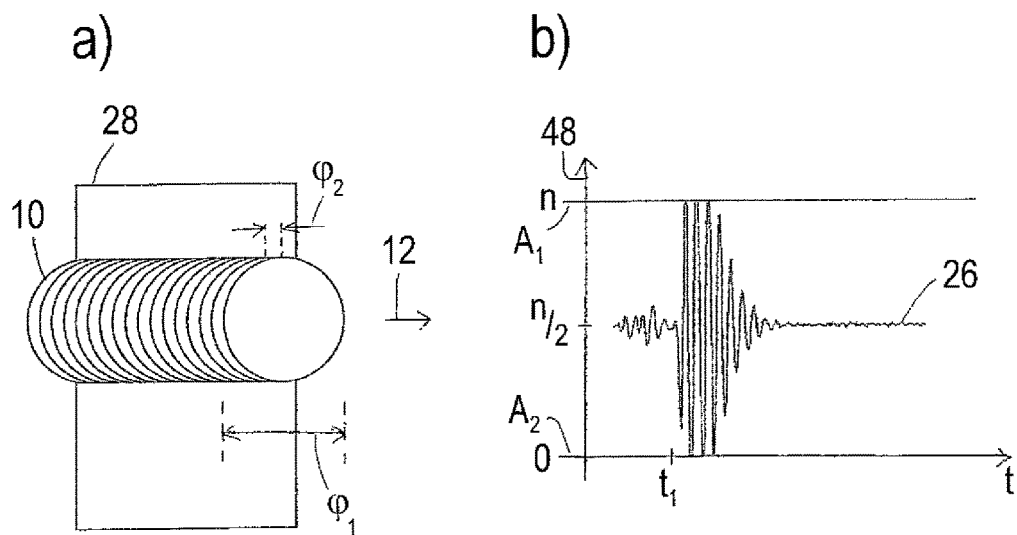
Figure 7:
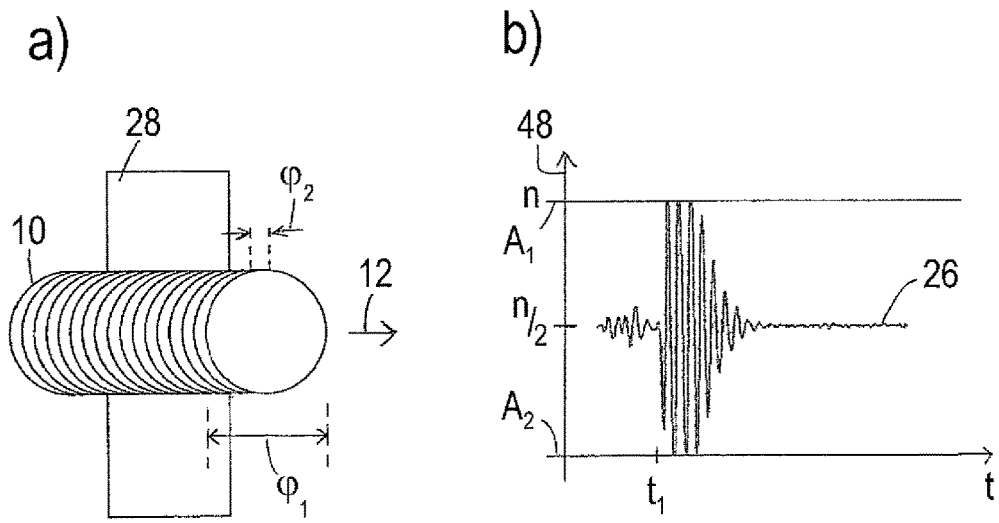

FIGS. 7a, b show the detection situation shown in FIGS. 6a, b on a presence of the smaller object 28. As shown in FIG. 7a, no transmitted pulses 10 which shoot completely past the object 28 are present here either due to the larger extent of the transmitted pulses 10. The resulting averaged received signal 26 (FIG. 7b) thus substantially corresponds to the received signal 26 shown in FIG. 6b. However, as soon as an even smaller object occurs, transmitted pulses 10 also completely shoot past the object in the embodiment shown in FIGS. 6 and 7, which then becomes noticeable in the corresponding received signal 26 by a reduction in the oscillation amplitudes. The embodiment shown in FIGS. 6 and 7 is thus also suitable for distinguishing extended objects, on the one hand, and very small objects such as tiny dust specks, on the other hand.

REFERENCE NUMERAL LIST 10 transmitted pulse
12 scanning direction
14 detection zone 16 return radiation
18, 20, 22 signal
24 group
26 averaged received signal
28 object
30 point in time
32 transmission emitter
34 deflection unit
35 mirror
36 axis of rotation
38 transmission lens
40 reception element
42 reception lens
44 front screen
46 housing
48 vertical axis
50, 52 amplitude difference
54 direction
φ scanning angle
$φ_1$ angular extent
$φ_2$ angular spacing
d spacing
$A_1$, $A_2$ peak value
n limit value
t time
$t_1$ point in time

The invention claimed is:

1. An optical detection apparatus which is configured
   to transmit a plurality of transmitted pulses (10) into a detection zone (14) after one another in different directions (54) following one another in a scanning direction (12) during a scan sweeping over a scanning angle (φ);
   to receive the radiation (16) of the transmitted pulses (10) respectively returning from the detection zone (14);
   to generate a received signal with respect to each transmitted pulse (10), said received signal depending on the variation with time of the returning radiation (16) of the transmitted pulse (10); and
   to average the received signals of a group (24) of transmitted pulses (26) to generate an averaged received signal (26), wherein the transmitted pulses of each group are transmitted one after the other in different directions following one-another in a scanning direction,
   wherein the angular extent ($φ_1$) related to the scanning angle (φ) of at least one transmitted pulse (10) of the group (24) at a spacing (d) from the detection apparatus disposed within the detection zone (14) is at most 20 times as large as the angular spacing ($φ_1$) related to the scanning angle (φ) between two transmitted pulses (10) of the group (24) directly adjacent in the scanning direction (12) and the cross-section of at least one transmitted pulse (10) of the group (24) at a spacing (d) from the detection apparatus disposed within the detection zone (14) has an overlap with at most one quarter of the remaining transmitted pulses (10) of the group (24), and
   wherein the apparatus is adapted to evaluate a peak value ($A_1$, $A_2$) of the averaged received signal (26) in order to determine the size of a detected object (28), wherein a smaller peak value ($A_1$, $A_2$) of the averaged received signal corresponds to a smaller object (28).

2. The apparatus in accordance with claim 1 which is configured as a laser scanner.

3. The apparatus in accordance with claim 1, wherein the apparatus is adapted to compare a peak value ($A_1$, $A_2$) of the averaged received signal (26) with at least one predefined value (n, 0).

4. The apparatus in accordance with claim 1, wherein the apparatus is adapted to recognize when a plurality of signal sections are present in the averaged received signal (26) which each indicate the presence of an object (28) and which have different peak values ($A_1$, $A_2$).

5. The apparatus in accordance with claim 1, wherein the apparatus is adapted to convert a unipolar signal (18) generated from the returning radiation (16) of the transmitted pulse (10) into a bipolar signal (20) for the generation of the received signal of a transmitted pulse (10).

6. The apparatus in accordance with claim 1, wherein the apparatus is adapted to quantize a signal (18, 20) generated from the returning radiation (16) of the transmitted pulse (10) for the generation of the received signal of a transmitted pulse (10).

7. The apparatus in accordance with claim 1, wherein the apparatus is adapted to quantize a signal (18, 20) generated from the returning radiation (16) of the transmitted pulse (10) for generating a binary signal (22).

8. An apparatus in accordance with claim 1, wherein the apparatus is adapted to sample in time a signal (18, 20, 22) generated from the returning radiation (16) of the transmitted pulse (16) for the generation of the received signal of a transmitted pulse (10).

9. The apparatus in accordance with claim 8, wherein the averaged received signal (26) comprises a plurality of averaged sampled values which each represent an averaged value of the sampled values corresponding to one another in time of the received signals of the transmitted pulses (10) of the group (24) of transmitted pulses (10).

10. The apparatus in accordance with claim 1, further comprising a transmission emitter (32) for the emission of transmitted pulses (10) which transmission emitter has an active emission surface having an extent between 1 and 10 μm.

11. The apparatus in accordance with claim 1, wherein the group (24) of transmitted pulses (10) comprises at least 40 transmitted pulses (10).

12. The apparatus in accordance with claim 1, wherein the apparatus is adapted to transmit a plurality of groups (24) of transmitted pulses (10) and to generate a respective received signal (26) from the received signals of the transmitted pulses (10) of a group (24).

13. The apparatus in accordance with claim 12, wherein the transmitted pulses (10) of different groups (24) are transmitted into the detection zone (14) in different directions (54).

14. An apparatus in accordance with claim 13, wherein the apparatus is adapted to recognize when the averaged received signals (26) of a plurality of adjacent groups (24) of transmitted pulses (10) each indicate the presence of an object (28).

15. The apparatus in accordance with claim 1, further comprising a deflection unit (34) which is rotatingly movable about an axis of rotation (36) and with which the transmitted pulses (10) can be directed into the detection zone (14) so that the direction (54) of a transmitted pulse (10) is respectively predefined by the angular position of the deflection unit (34) during the transmission of the transmitted pulse (10).

16. A method of detecting objects (28) arranged in a detection zone (14) using an optical detection apparatus, said method comprising the steps of:
   transmitting a plurality of transmitted pulses (10) into a detection zone (14) after one another in different directions (54) following one another in a scanning direction (12) during a scan sweeping over a scanning angle ((p);

receiving the radiation (16) of the transmitted pulses (10) respectively returning from the detection zone (14);

generating a received signal with respect to each transmitted pulse (10), said received signal depending on the variation with time of the returning radiation (16) of the transmitted pulse (10); and averaging the received signals of a group (24) of transmission pulses (10) to generate an averaged received signal (26) wherein the transmitted pulses of each group are transmitted one after the other in different directions following one-another in a scanning direction, wherein the angular extent ($\varphi_1$) related to the scanning angle ($\varphi$) of at least one transmitted pulse (10) of the group (24) at a spacing (d) from the detection apparatus disposed within the detection zone (14) is at most 20 times as large as the angular spacing ($\varphi_1$) related to the scanning angle ($\varphi$) between two transmitted pulses (10) of the group (24) directly adjacent in the scanning direction (12) and the cross-section of at least one transmitted pulse (10) of the group (24) at a spacing (d) from the detection apparatus disposed within the detection zone (14) has an overlap with at most one quarter of the remaining transmitted pulses (10) of the group (24), wherein the apparatus is adapted to evaluate a peak value ($A_1$, $A_2$) of the averaged received signal (26) in order to determine the size of a detected object (28), wherein a smaller peak value ($A_1$, $A_2$) of the averaged received signal corresponds to a smaller object (28).

17. The method in accordance with claim 16, wherein the optical detection apparatus is configured
- to transmit the plurality of transmitted pulses (10) into the detection zone (14);
- to receive the radiation (16);
- to generate the received signal with respect to each transmitted pulse (10); and
- to average the received signals of a group (24) of transmitted pulses (26).

* * * * *